United States Patent
Zerbe et al.

(10) Patent No.: US 10,788,882 B2
(45) Date of Patent: Sep. 29, 2020

(54) USING DYNAMIC BURSTS TO SUPPORT FREQUENCY-AGILE MEMORY INTERFACES

(71) Applicant: Rambus Inc., Sunnyvale, CA (US)

(72) Inventors: Jared L. Zerbe, Woodside, CA (US); Brian Hing-Kit Tsang, Fremont, CA (US); Barry William Daly, Chapel Hill, NC (US)

(73) Assignee: Rambus Inc., San Jose, CA (US)

( * ) Notice: Subject to any disclaimer, the term of this patent is extended or adjusted under 35 U.S.C. 154(b) by 58 days.

(21) Appl. No.: 16/134,577

(22) Filed: Sep. 18, 2018

(65) Prior Publication Data

US 2019/0086990 A1 Mar. 21, 2019

Related U.S. Application Data

(63) Continuation of application No. 15/390,367, filed on Dec. 23, 2016, now Pat. No. 10,108,246, which is a
(Continued)

(51) Int. Cl.
*G06F 1/3203* (2019.01)
*G06F 1/3237* (2019.01)
(Continued)

(52) U.S. Cl.
CPC ............ *G06F 1/3237* (2013.01); *G06F 1/324* (2013.01); *G06F 1/3287* (2013.01);
(Continued)

(58) Field of Classification Search
CPC ..................................................... G06F 1/3203
(Continued)

(56) References Cited

U.S. PATENT DOCUMENTS

| | | | |
|---|---|---|---|
| 4,370,712 A * | 1/1983 | Johnson | ................. G06F 12/04 365/230.01 |
| 4,385,369 A | 5/1983 | Sheppard | |

(Continued)

FOREIGN PATENT DOCUMENTS

| | | |
|---|---|---|
| WO | WO-1999-019874 A1 | 4/1999 |
| WO | WO 2011-056729 A2 | 5/2011 |

OTHER PUBLICATIONS

PCT International Preliminary Report on Patentability dated Mar. 26, 2015 re Int'l Appln. No. PCT/US2013/058576. 10 pages.
(Continued)

*Primary Examiner* — Suresh Suryawanshi
(74) *Attorney, Agent, or Firm* — Park, Vaughan, Fleming & Dowler LLP; Laxman Sahasrabuddhe

(57) ABSTRACT

The disclosed embodiments relate to a system that supports dynamic bursts to facilitate frequency-agile communication between a memory controller and a memory device. During operation, the system monitors a reference clock signal received at an interface between the memory device and the memory controller. Upon detecting a frequency change in the reference clock signal from a fullrate to a subrate, the interface operates in a burst mode, wherein data is communicated through bursts separated by intervening low-power intervals during which portions of the interface are powered down.

17 Claims, 8 Drawing Sheets

Related U.S. Application Data continuation of application No. 14/416,088, filed as application No. PCT/US2013/058576 on Sep. 6, 2013, now Pat. No. 9,568,980.

(60) Provisional application No. 61/699,660, filed on Sep. 11, 2012.

(51) Int. Cl.
*G06F 13/16* (2006.01)
*G06F 1/324* (2019.01)
*G06F 1/3287* (2019.01)
*G06F 13/28* (2006.01)

(52) U.S. Cl.
CPC ...... *G06F 13/1673* (2013.01); *G06F 13/1689* (2013.01); *G06F 13/28* (2013.01); *Y02D 10/126* (2018.01); *Y02D 10/171* (2018.01); *Y02D 50/20* (2018.01)

(58) Field of Classification Search
USPC ........................................... 713/322
See application file for complete search history.

(56) References Cited

U.S. PATENT DOCUMENTS

| | | | |
|---|---|---|---|
| 5,734,848 A * | 3/1998 | Gates | G06F 3/0601 710/315 |
| 6,457,075 B1 * | 9/2002 | Koutsoures | G06F 13/28 710/35 |
| 7,085,152 B2 | 8/2006 | Ellis et al. | |
| 8,185,072 B2 | 5/2012 | Hunsaker et al. | |
| 8,248,995 B2 | 8/2012 | Mark et al. | |
| 8,689,028 B2 | 4/2014 | Diefenbaugh et al. | |
| 8,769,591 B2 | 7/2014 | Gahm et al. | |
| 9,477,586 B1 * | 10/2016 | Hedinger | G06F 12/00 |
| 2001/0047493 A1 * | 11/2001 | Tsern | G06F 1/3225 713/501 |
| 2006/0187226 A1 | 8/2006 | Bruno et al. | |
| 2008/0040624 A1 | 2/2008 | Wilcox | |
| 2008/0172515 A1 * | 7/2008 | Croxford | G06F 13/1684 711/5 |
| 2009/0231171 A1 | 9/2009 | Boomer et al. | |
| 2010/0091921 A1 | 4/2010 | Den Besten et al. | |
| 2013/0191679 A1 | 7/2013 | Zhuang et al. | |
| 2013/0315257 A1 | 11/2013 | Welin et al. | |
| 2014/0208144 A1 | 7/2014 | Ma | |

OTHER PUBLICATIONS

PCT International Search Report and Written Opinion dated Jan. 31, 2014 in International Application No. PCT/US2013/058576. 13 pages.

* cited by examiner

USING DYNAMIC BURSTS TO SUPPORT FREQUENCY-AGILE MEMORY INTERFACES

RELATED APPLICATION

This patent application is a continuation of U.S. application Ser. No. 15/390,367, having the same title and inventors, filed on 23 Dec. 2016, the contents of which are herein incorporated by reference in their entirety for all purposes. U.S. application Ser. No. 15/390,367 is a continuation of U.S. application Ser. No. 14/416,088 (which issued as U.S. Pat. No. 9,568,980), having the same title and inventors, filed on 21 Jan. 2015, the contents of which are herein incorporated by reference in their entirety for all purposes. U.S. application Ser. No. 14/416,088 is a U.S. National Stage Application of PCT Application No. PCT/US2013/058576, having the same title and inventors, filed on 6 Sep. 2013, the contents of which are herein incorporated by reference in their entirety for all purposes. PCT Application No. PCT/US2013/058576 claims benefit of U.S. Provisional Application No. 61/699,660, having the same title and inventors, filed on 11 Sep. 2012, the contents of which are herein incorporated by reference in their entirety for all purposes.

BACKGROUND

Field

The disclosed embodiments generally relate to clocked memory systems. More specifically, the disclosed embodiments relate to a clocked memory system that supports dynamic bursts to facilitate agile communication between a memory controller and a memory device at varying data loads and improved power efficiency.

Related Art

A portable computing device typically enters a power-saving mode to operate at reduced clock speeds when computational workloads are low. These reduced clock speeds enable the supply voltage to be reduced for rail-to-rail Complementary Metal-Oxide-Semiconductor (CMOS) circuits in the portable computing device, which reduces power consumption and thereby extends battery life. However, link interface circuitry between the processor and the memory as well as analog/mixed-mode circuitry is typically not implemented exclusively in rail-to-rail CMOS and consequently cannot always take full advantage of these speed and voltage reductions. Hence, link/mixed-mode circuitry continues to burn some static power, even though less data is being transferred during the power-saving mode. As a consequence, the power consumed per-bit-transferred by a link can actually increase when the system enters a power-saving mode even though the total power is reduced. In addition, for optimal system power efficiency, most links have a particular operating speed at which they are most power efficient. Ideally the links would, when operational, always be operating at this "sweet spot."

Hence, what is needed is a method and an apparatus for reducing the power consumption for the link circuitry, roughly proportionally, when a portable computing device enters a power-saving mode that reduces the average data delivery rate.

DETAILED DESCRIPTION

Figure 1:
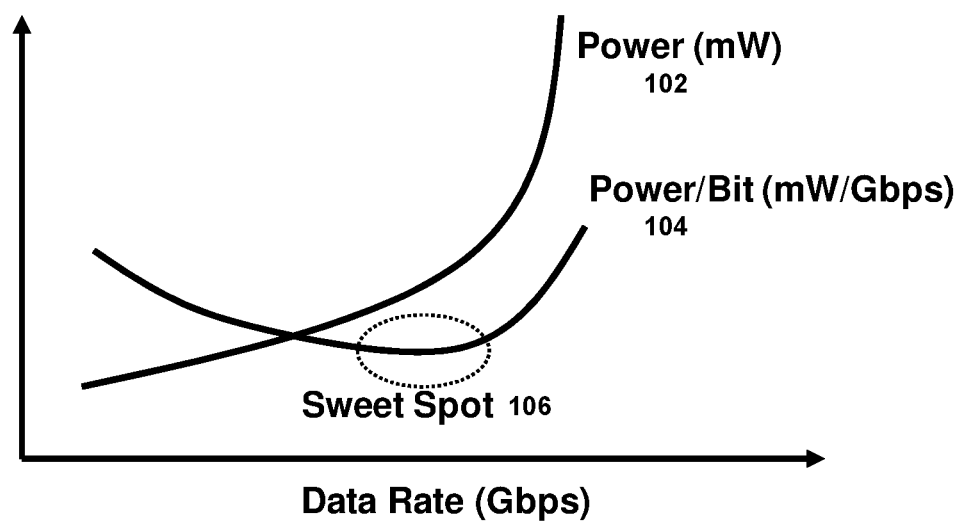
FIG. 1 illustrates a sweet spot for power consumption in memory link circuitry in accordance with the disclosed embodiments.

As mentioned previously, during a power-saving mode it is desirable to reduce power consumption in the link circuitry which connects the processor and the memory. For example, the graph presented in FIG. 1 illustrates power consumption 102 for a link (in mW) and also energy consumed per bit transferred 104 (in mW/Gbps) as a function of the data rate. In this graph, the horizontal axis is associated with data rate (in Gbps) and the vertical axis is associated with power (in mW) and energy consumption per bit (in mW/Gbps). Note that as the data rate increases, power consumption 102 also increases. In contrast, as data rate increases, the energy consumed per bit 104 actually decreases until a sweet spot 106 is reached. This decrease in energy consumed per bit 104 is due to the fact that at lower data rates certain portions of the link circuitry continue to consume constant power whether the link is transmitting data or not, so energy consumption per bit 104 actually increases. (For example, when the link is not transmitting data, often phase-locked loops (PLLs) and terminators continue to consume power.) As the data rate increases toward the sweet spot, the link amortizes this power so the energy consumed per bit 106 decreases. As the data rate increases past sweet spot 106, the power consumption per bit 104 increases as the fanout of key nodes inside the design generally must be reduced in order for the design to be able to continue to meet the performance target.

To minimize power consumption it is desirable to operate the link in or near sweet spot 106 if possible. This can be accomplished by using link technology with a fast bias turn-on mechanism and a link which either always operates at or near the sweet-spot data rate or is shut-off altogether. With a very fast power-on mechanism it is possible to achieve power efficiencies near that of the sweet spot while operating at effective data rates from near zero up to the full-active sweet-spot point via 'bursting' of data in specific blocks of high-speed activity. Between bursts the link is powered down or very nearly powered down. This makes it possible to transmit and receive data at the sweet spot data rate and power efficiency. In one embodiment of the invention, such a burst at high frequency and power-down occurs when the rest of the system is operating at a reduced clock rate during a power-saving mode.

More specifically, during a read operation when the system determines that a reference clock is operating at a reduced frequency from its peak rate (which indicates the system is operating in a power-saving state), the system keeps a bit clock running at a proportionally higher rate (e.g., the same rate used when the system is running at normal frequency, or a rate that does not scale down proportionally when the system reference clock rate scales down) until it is finished with a current burst and then shuts down. Next, when another set of data becomes available to be transmitted from a transmit FIFO, the system bursts the data at the higher rate and then shuts down again. For instance, when the reference clock is operating at half rate, the link is turned on approximately half the time at a full frequency and is turned off approximately half the time, as opposed to being turned on all the time at half the frequency. By setting the full-frequency for the link speed at the sweet spot and dynamically bursting between an active and a power-down state when the reference clock has been shifted down, a very power efficient system can be designed.

A system that supports such dynamic bursts is described in more detail below.

Clock Multiplier Circuitry

Figure 2A:
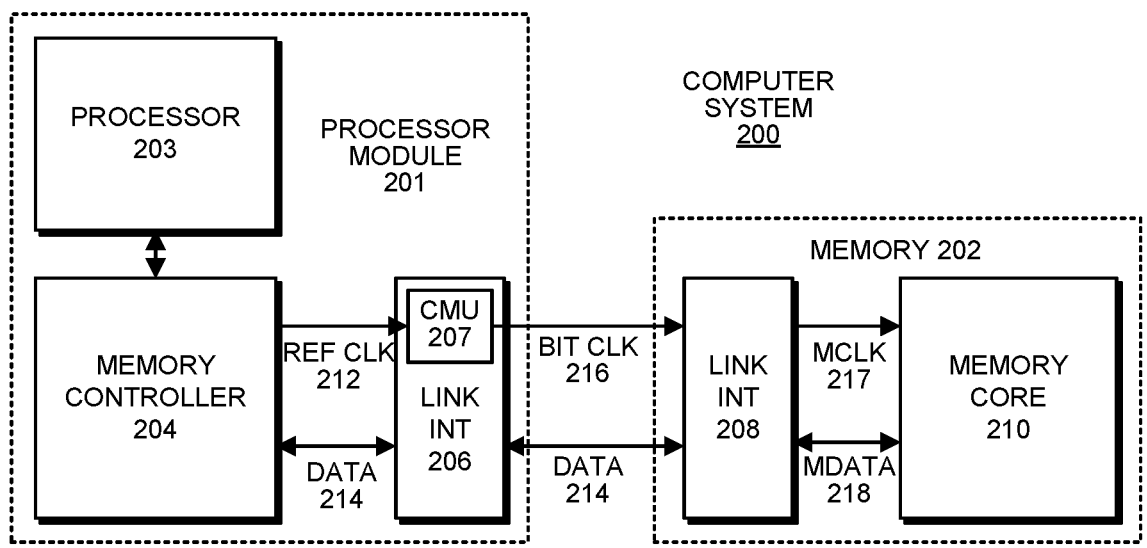
FIG. 2A illustrates a computer system in accordance with the disclosed embodiments.

FIG. 2A illustrates an exemplary computer system 200 which supports dynamic bursts in accordance with the disclosed embodiments. Exemplary computer system 200 includes a processor module 201, which is coupled to a memory 202 through a link interface. Processor module 201 includes a processor 203 which is coupled to a memory controller 204 that coordinates accesses to memory 202. More specifically, memory controller 204 is coupled to a processor-side link interface 206, which communicates with a corresponding memory-side link interface 208 in memory 202. Memory-side link interface 208 in turn communicates with a memory core 210. Note that processor module 201 can be implemented as a chip module containing multiple semiconductor chips, or alternatively as a single semiconductor chip.

Processor-side link interface 206 and memory-side link interface 208 each include both incoming and outgoing first-in-first out (FIFO) buffers (not illustrated), which facilitate sending and receiving bursts or packets of data at a proportionally higher clock rate than the rest of the system is operating at during a power-saving mode.

During system operation, memory controller 204 provides a reference clock signal 212 to processor-side memory link interface 206. Note that reference clock signal 212 can change frequencies as computer system 200 changes power-saving modes. For example, reference clock signal 202 can provide a nominal clock frequency F during normal system operation, and can provide a reduced clock frequency, such as F/2, F/4, F/8 or F/16, during a power-saving mode.

Reference clock signal 212 feeds into a clock multiplier unit (CMU) 207, which uses the reference clock signal 212 to generate a bit clock signal 216. Bit clock signal 216 is used to coordinate data transfers between processor-side link interface 206 and memory-side link interface 208, and possibly to coordinate data-transfers between memory-side link interface 208 and memory core 210. Note that the corresponding clock and data signals within memory 202, namely memory clock (MCLK) signal 217 and memory data (MDATA) signal 218, reside in a parallel clock domain and could be at a lower frequency.

To save power during data transfer operations, processor-side link interface 206 and memory-side link interface 208 communicate with each other through bursts which are clocked at a power-efficient "sweet spot" data rate. These bursts are separated by intervals where the link circuitry is powered down to conserve power. These bursts are generated using CMU 207 which is described in more detail below with reference to FIG. 2B. In some embodiments, the size of a burst is a cache line size or a multiple or a fraction of the cache line size.

Clock Multiplier Circuitry

Figure 2B:
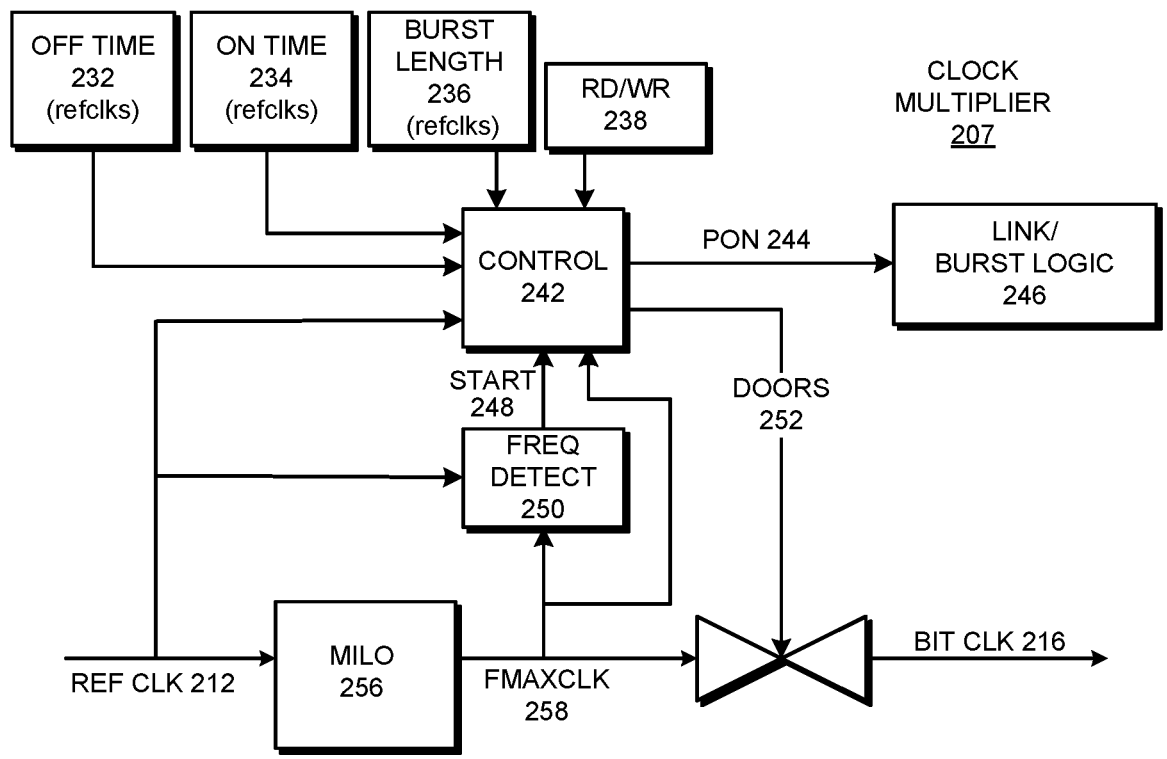
FIG. 2B illustrates a clock multiplier circuit in accordance with the disclosed embodiments.

FIG. 2B illustrates clock multiplier unit (CMU) 207 in accordance with the disclosed embodiments. This CMU 207 receives a reference clock signal 212 and generates a non-continuous bit clock signal 216 which is used to coordinate data transfers across the link interface between processor and memory.

Reference clock signal 212 feeds into, e.g., a multiplying injection-locked oscillator (MILO) 256, which generates a maximum frequency signal $F_{MAXCLOCK}$ 258. (Although the illustrated embodiment uses a MILO to generate $F_{MAXCLOCK}$ 258, in general any clock generator (e.g., a PLL) can be used to generate $F_{MAXCLOCK}$ 258.) Note that during a normal high-speed operation, reference clock signal 212 operates at a nominal frequency F. However, during a power-saving mode, reference clock signal 212 can operate at a reduced frequency, such as F/2, F/4, F/8 or F/16. Hence, MILO 256 is designed to be able to lock to frequency F or to any sub-harmonic of F, such as F/2, F/4, F/8 or F/16. In other embodiments, a PLL (Phase-Locked Loop) with programmable feedback dividers can be used for a similar function.

A frequency-detection circuit 250 compares the reference clock signal 212 with $F_{MAXCLOCK}$ 258 and determines whether reference clock signal 212 is operating at a reduced frequency (which indicates that the system is operating in a reduced power mode). If so, frequency-detection circuit 250 asserts a "start" signal 248 which feeds into a control circuit 242.

Control circuit 242 is responsible for controlling the generation of dynamic bursts during power saving modes. To accomplish this task, control circuit 242 receives a number of inputs, including: (1) a reference clock signal 212, (2) $F_{MAXCLOCK}$ signal 258, (3) an off-time value 232 (in reference clocks), which indicates how long the link remains powered off between bursts, (4) an on-time value (in reference clocks), which indicates how long the link remains powered on during a burst, (5) a burst length value 236, which indicates the length of the burst, and finally (6) a read/write value, which indicates whether the current memory operation is a read or a write. Control circuit 242 generates a power-on signal (PON) 244, which activates or deactivates power to the link and associated burst logic 246. Control circuit 242 also generates a doors signal 252, which is used to gate $F_{MAXCLOCK}$ 258 to generate a non-continuous bit clock signal 216, which is used to control transmission of a dynamic burst. The doors signal 252 is carefully synchronized to the bit clock to avoid runt clock pulses entering the system and potentially causing erroneous operation.

The circuitry illustrated in FIG. 2B operates to coordinate dynamic bursts, and is described in more detail below with reference to the state diagrams in FIGS. 3A and 3B and the timing diagrams in FIGS. 4A and 4B. Note that the dynamic bursts can be either "front loaded" or "back loaded." In general, the term "front loaded" means the burst is sent as soon as possible with the idle/power-down period placed after the burst, whereas the term "back loaded" means the system waits to send the burst until after an appropriate idle/power-down time. Memory read operations are generally front-loaded because it is desirable to receive first-word read data as soon as possible. During a front-loaded read operation, as soon as the processor-side link interface 206 receives the first read command and address from the controller, the link interface 206 bursts the command and address to the memory-side link interface 208. Next, when the data is being returned from the memory to the memory controller, after each returning burst of read data is transferred, the link interface powers down until the processor interface, which is operating at a reduced rate, can catch up. Then, when the incoming data FIFO at the processor-side link interface 206 gets close to empty, the system powers up again and transfers additional read data. Memory write operations can be back-loaded in order to not excessively burden the processor which is running at a reduced rate. This generally does not result in a performance loss as writes, in general, can be queued. During such back-loaded write operations, the system waits until the memory controller has received almost all of the data and the FIFO is nearly full before starting to transfer a write burst to memory.

Note that an alternative implementation does not use counters but instead compares FIFO pointers against "trip points" to determine when to activate and deactivate the above-mentioned signals that control the bursts.

Counter-Based Operation for Front-Loaded Reads and Writes

Figure 3A:
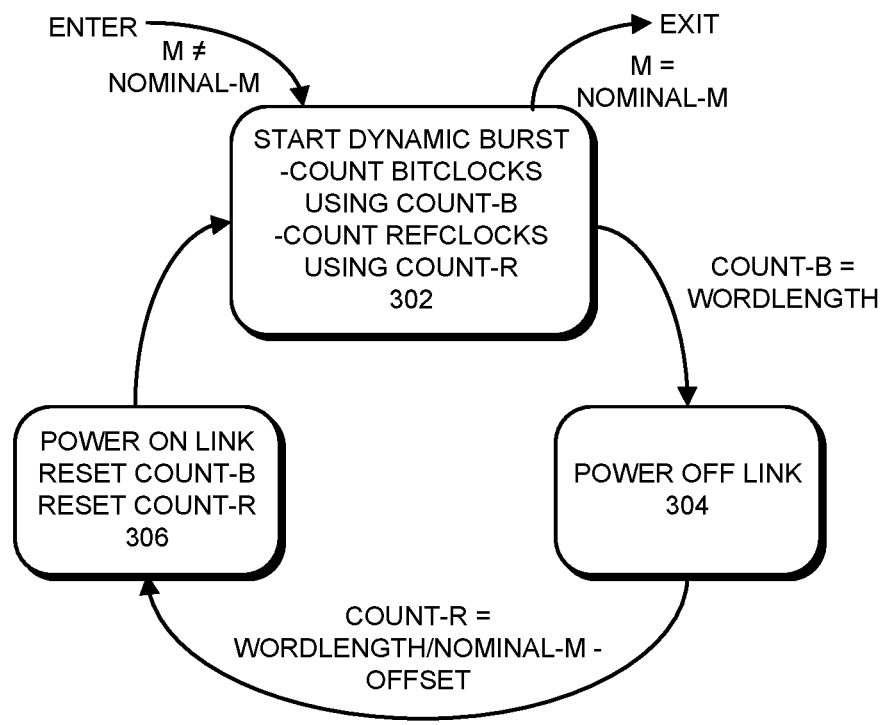
FIG. 3A presents a state diagram illustrating operation of a counter-based implementation for front-loaded reads and writes in accordance with the disclosed embodiments.

FIG. 3A presents a state diagram illustrating operation of a counter-based implementation for front-loaded reads and writes in accordance with the disclosed embodiments. At the start of the process, the system enters state 302 when the system determines that M (bit clock frequency/reference clock frequency) is not equal to NOMINAL-M (the nominal bit clock: reference clock multiplication ratio). This indicates that the system is operating at a reduced frequency in a power-saving mode. During state 302, the system starts a dynamic burst. At the same time, the system starts counting bit clocks using a counter variable COUNT-B and starts counting reference clocks using a counter variable COUNT-R.

Next, when COUNT-B=WORDLENGTH, the system moves to state 304 where the link is powered off (step 304). During this power-off state, the reference clock counter COUNT-R continues to count reference clocks.

Next, when COUNT-R reaches WORDLENGTH/NOMINAL-M-OFFSET (where OFFSET is the time required to turn off the link in reference clocks), the system moves to state 306. During state 306, the link is powered on again and the counters COUNT-B and COUNT-R are reset.

The system then moves back to state 302 to process the next dynamic burst. If at this point M=NOMINAL-M, which indicates that the system is no longer in power-saving mode, the system exists state 302 and stops generating dynamic bursts.

Counter-Based Operation for Back-Loaded Writes

Figure 3B:
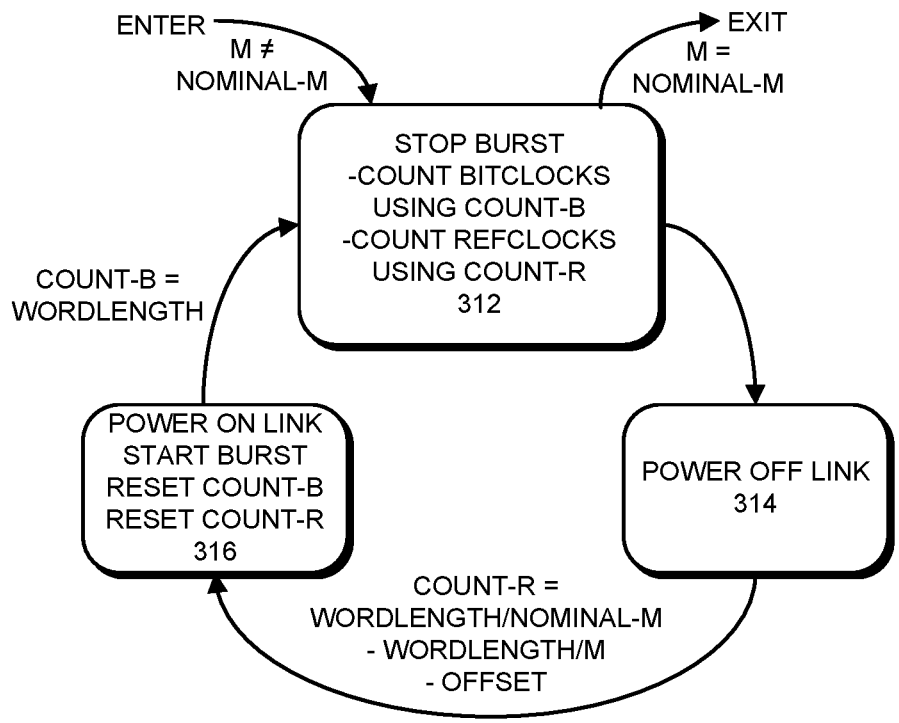
FIG. 3B presents a state diagram illustrating operation of a counter-based implementation for back-loaded writes in accordance with the disclosed embodiments.

FIG. 3B presents a state diagram illustrating operation of a counter-based implementation for a back-loaded burst in accordance with the disclosed embodiments. At the start of the process, the system enters state 312 when the system determines that M is not equal to NOMINAL-M. This indicates that the system is operating at a reduced frequency in a power-saving mode. During state 312, the system ends a currently active dynamic burst (if state 312 is entered from a bursting condition). At the same time, the system starts counting bit clocks using COUNT-B and starts counting reference clocks using COUNT-R. Next, the system moves to state 314 where the link is powered off.

In state 314, when COUNT-R reaches WORDLENGTH/NOMINAL-M-WORDLENGTH/M-OFFSET, the system moves to state 316. By waiting for COUNT-R to reach this value, the system ensures that enough data has been received in the FIFO to ensure that a burst transfer can complete. Note that by subtracting the value WORDLENGTH/M from WORDLENGTH/NOMINAL-M, the system does not actually wait until all the burst data is received, but can instead start the burst a little earlier—while the last portion of the burst is being received at the FIFO, but ensures that by the time the burst is completed all the data of length <WORDLENGTH> will have been sent. During state 316, the link is powered on again, counters COUNT-B and COUNT-R are reset, and the back-loaded burst is started.

When COUNT-B reaches WORDLENGTH, the system moves back to state 312 to process the next dynamic burst. If at this point M=NOMINAL-M, which indicates that the system is no longer in power-saving mode, the system exists state 312 and stops generating dynamic bursts.

Read Operation

Figure 4A:
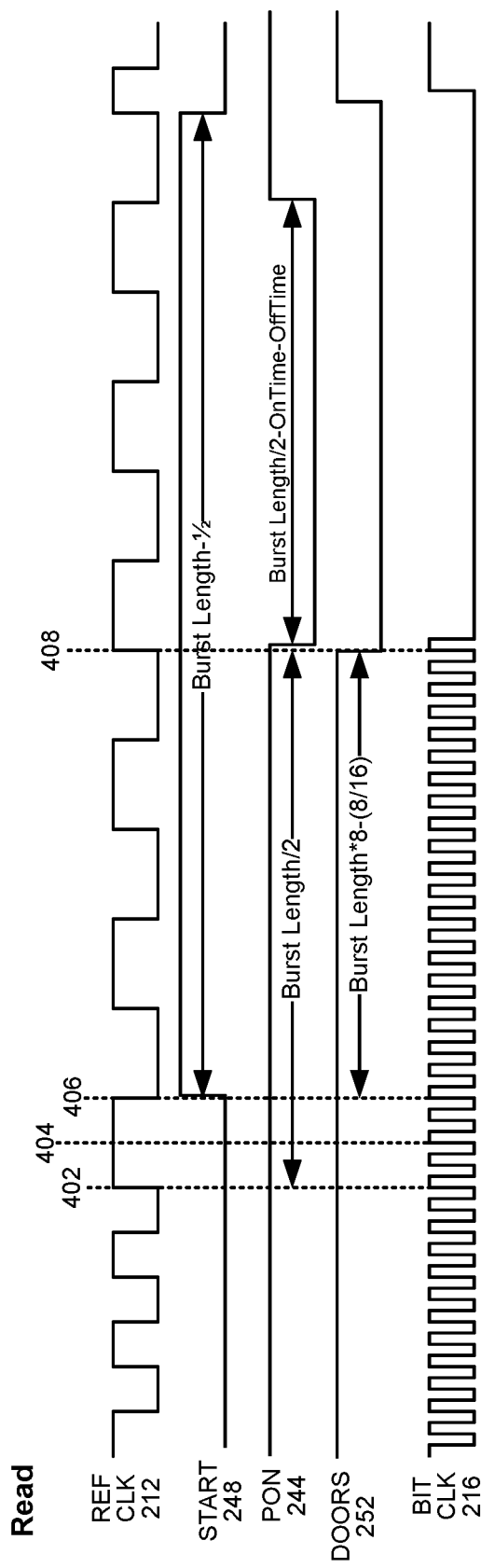
FIG. 4A presents a timing diagram for a read operation in accordance with the disclosed embodiments.

FIG. 4A illustrates a timing diagram for a front-loaded read operation in accordance with the disclosed embodiments. The process starts when the reference clock signal 212 moves to a new frequency at time 402. Next, the link interface detects this new frequency at time 404 when an expected falling edge in the reference clock signal 212 does not occur. Then, when the falling edge finally does occur at time 406 the system can resolve the new frequency (determine whether the new frequency is F/2, F/4, F/8 or F/16). At this point, start signal 248 is asserted to indicate that the system is entering the dynamic burst mode. At a later time 408, the last byte of data for a first dynamic burst has been sent. At this time, the doors signal 252 is deasserted, which causes bit clock signal 216 to shut down. This takes a small amount of time, after which PON signal 244 is deasserted. PON signal 244 remains off for a number of reference clock cycles specified by off-time counter 232 in FIG. 2A. Then, PON signal 244 is reasserted, and a short time later doors signal 252 is reasserted. At this point a new burst can be started. Alternatively, if the reference clock frequency has returned to a nominal frequency, which indicates that the system is no longer in a power-saving mode, the system can exit the burst mode and the start signal 248 is deasserted, as is indicated in FIG. 4A.

Write Operation

Figure 4B:
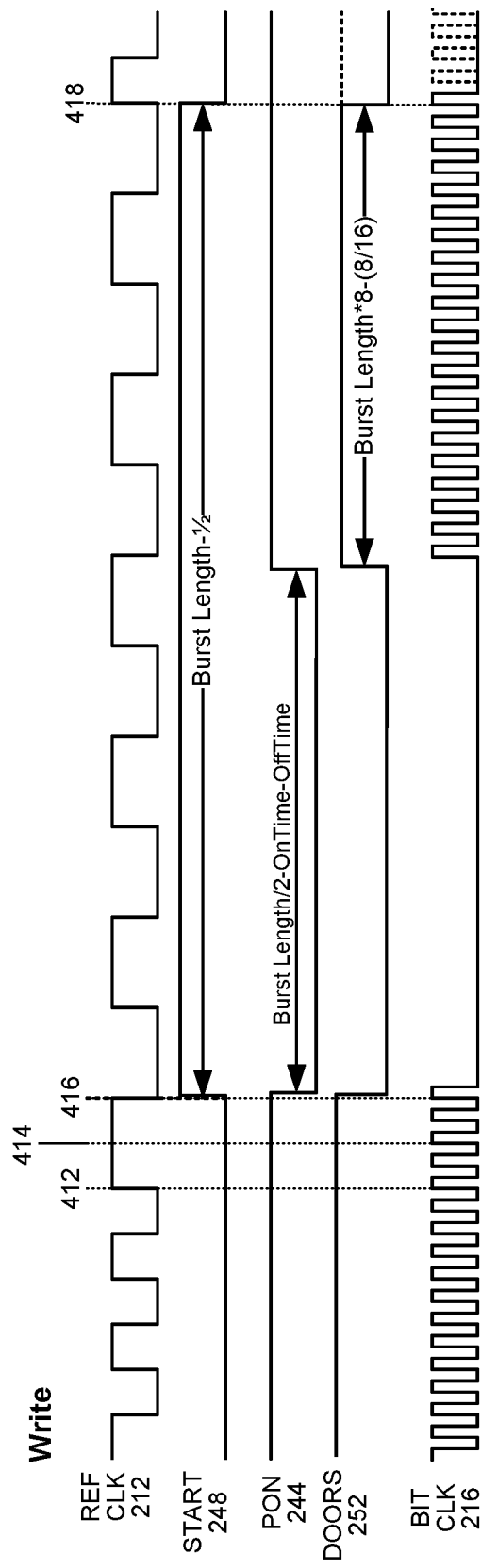
FIG. 4B presents a timing diagram for a write operation in accordance with the disclosed embodiments.

FIG. 4B illustrates a timing diagram for a back-loaded write operation in accordance with the disclosed embodiments. As in the case of a read operation, the process starts when the reference clock signal 212 moves to a new frequency at time 412. Next, the link interface detects this new frequency at time 414 when an expected falling edge in the reference clock signal 212 does not occur.

Then, when the falling edge finally does occur at time 416 the system resolves the new frequency. At this point, start signal 248 is asserted to indicate that the system is entering the dynamic burst mode. Also, the doors signal 252 is deasserted to shut off the bit clock 216. This takes a small amount of time, and includes the completion of whatever activity (write or read) is currently in the pipeline, after which PON signal 244 is deasserted. In an alternative embodiment, the system enters the dynamic burst mode at time 414 as soon as the new frequency is detected but before the new frequency is actually resolved at time 416. In this embodiment, the system initially assumes that the reference clock frequency has been reduced by a factor of two and slower frequencies are dealt with when the new frequency is ultimately determined at time 416.

PON signal 244 then remains deasserted for a number of reference clock cycles specified by off-time counter 232 in FIG. 2A. Then, PON signal 244 is reasserted, and a short time later doors signal 252 is reasserted. At a later time 418, the last byte of data for the dynamic burst has been sent. At this point, the doors signal 252 is deasserted again, which causes bit clock signal 216 to shut down.

Finally, if the reference clock signal 212 has returned to a nominal frequency, which indicates that the system is not longer in a power-saving mode, the system exits the burst mode and the start signal 248 is deasserted as is indicated in FIG. 4B.

Although the previous embodiments illustrate the link being powered off between each neighboring pair of memory transactions when the processor is operating at a sub-rate, at least some situations could result in multiple transactions being queued by a host processor to the memory controller, and ready for servicing by the memory system, even at sub-rate operation. In such cases, the memory controller can execute several full-rate transactions without shutting down the link between the transactions, and then shut down the link for a longer period to match the host processor's average data rate.

Although previous embodiments describe a ratio of F/2, F/4, F/8 or F/16, lower or alternate frequencies could be used in alternate embodiments and still achieve the primary goal of the invention—operation at a location closer to the sweet-spot operation for the interface, with adjacent power-down periods to save power and match the total burst length.

Burst Mode

Figure 5A:
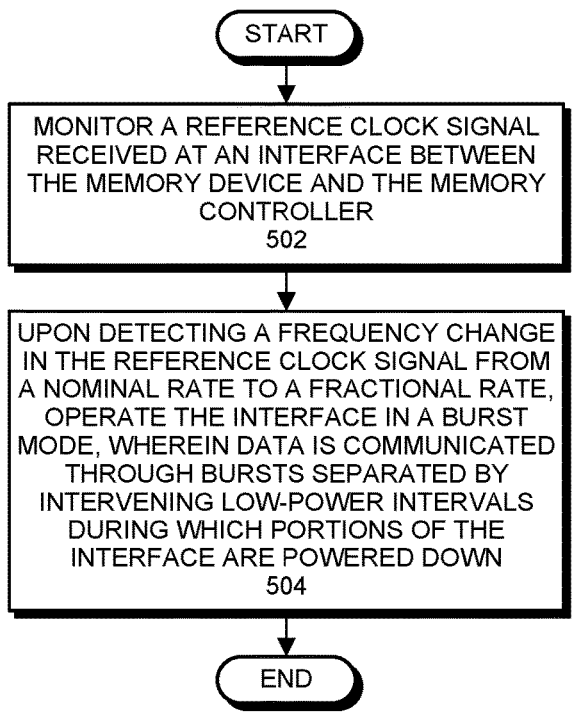
FIG. 5A presents a flow chart illustrating operations involves in a burst mode in accordance with the disclosed embodiments.

FIG. 5A presents a flow chart illustrating operations performed by a system that supports burst mode in accordance with the disclosed embodiments. During operation, the system monitors a reference clock signal received at an interface between the memory device and the memory controller (step 502). Next, upon detecting a frequency change in the reference clock signal from a nominal rate (full rate) to a fractional rate (subrate), the system operates the interface in a burst mode. During the burst mode, data is communicated through bursts separated by intervening low-power intervals during which portions of the interface are powered down (step 504).

Figure 5B:
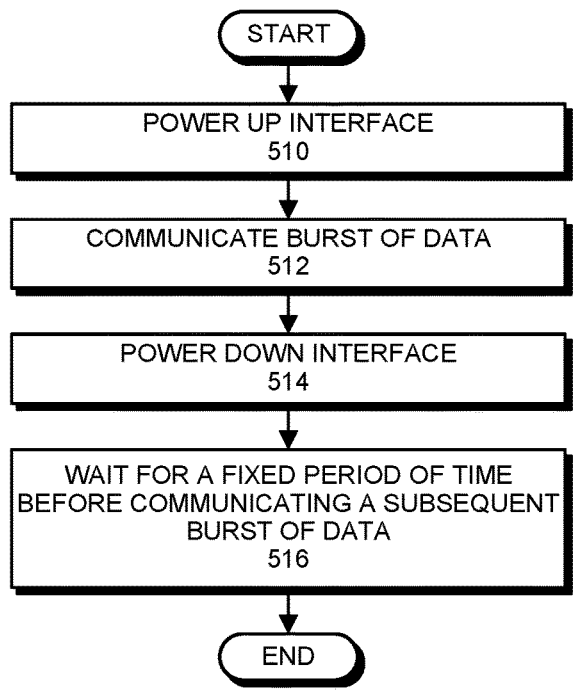
FIG. 5B presents a flow chart illustrating how the interface is powered on and powered off during the burst mode in accordance with the disclosed embodiments.

More specifically, as is illustrated in FIG. 5B, to send a burst the system first powers up the interface (step 510). The system then communicates a burst of data (step 512) and subsequently powers down the interface (step 514). Next, the system waits a fixed period of time before communicating a subsequent burst of data (step 516).

Figure 5C:
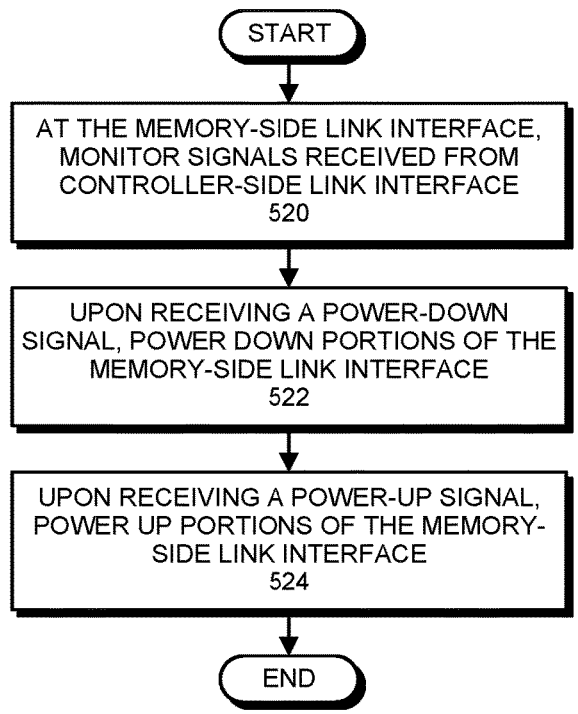
FIG. 5C presents a flow chart illustrating how the memory-side interface is powered on and powered off to facilitate a burst mode in accordance with the disclosed embodiments.

As is illustrated in FIG. 5C, at the memory-side link interface, the system monitors a signal received from the controller-side link interface (step 520). Upon receiving a power-down signal from the controller-side link interface, the system powers down portions of the memory-side link interface (step 522). Then, upon receiving a power-up signal from the controller-side link interface, the system powers up portions of the memory-side link interface (step 524).

Figure 6:
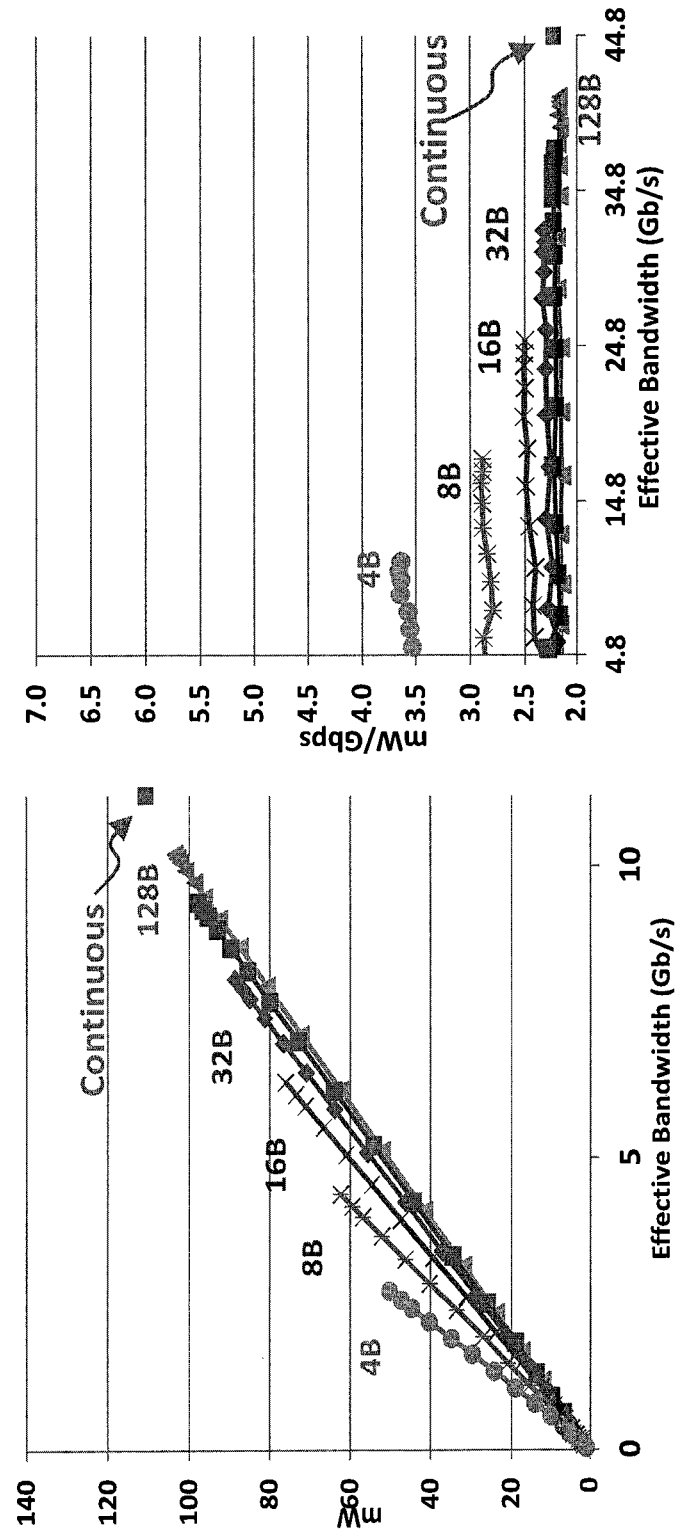
FIG. 6 illustrates power consumption and power consumption efficiency as a function of effective bandwidth for a system with an 8 nS turn-on time in accordance with the disclosed embodiments.

FIG. 6 illustrates both power consumption and power consumption efficiency as a function of effective bandwidth for a system with an 8 nS turn-on time in accordance with the disclosed embodiments. The graph on the left-hand side of FIG. 6, presents power consumption (mW) as a function of effective bandwidth for different burst sizes, namely 4 bytes, 8 bytes, 16 bytes, 32 bytes, 64 bytes and 128 bytes. At the far right side of this graph is a single point representing power consumption for continuous data transmission at the maximum clock rate. Each line represents power consumption for a different burst length across a range of effective bandwidths. Note that the effective bandwidth can be varied by changing the spacing between bursts. Hence, as the effective bandwidth decreases, the spacing between bursts increases and as the effective bandwidth increases the spacing between bursts decreases. Note that the spacing between bursts includes both a turn-off time and a subsequent turn-on time when power is consumed and no data is being transmitted or received. Such times can be viewed as overhead for the burst operation. Because of these turn-on/turn-off times the spacing between bursts cannot be zero. Note that this minimum spacing prevents the effective bandwidth of a given burst size from reaching the effective bandwidth for continuous data transmission, and thus there is a gap between the last burst point and the continuous point in the graph.

The graph on the right-hand side of FIG. 6 presents energy consumption per bit transferred (mW/Gbps) as a function of effective bandwidth for the different burst sizes, namely 4 bytes, 8 bytes, 16 bytes, 32 bytes, 64 bytes and 128 bytes. Note that this energy consumption per bit decreases significantly as the burst size increases because the power overhead involved in turning on and turning off the link circuitry can be amortized over more bits as the burst size increases.

The preceding description was presented to enable any person skilled in the art to make and use the disclosed embodiments, and is provided in the context of a particular application and its requirements.

Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein. Accordingly, many modifications and variations will be apparent to practitioners skilled in the art. Additionally, the above disclosure is not intended to limit the present description. The scope of the present description is defined by the appended claims.

Also, some of the above-described methods and processes can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and apparatus described can be included in but are not limited to, application-specific integrated circuit (ASIC) chips, field-programmable gate arrays (FPGAs), and other programmable-logic devices.

What is claimed is:

1. A method, comprising:
   in response to detecting a decrease in a first data rate of a first interface of a memory controller, operating a second interface of the memory controller in burst mode by alternating the second interface between a power-on state and a power-off state.

2. The method of claim 1, wherein said alternating the second interface between the power-on state and the power-off state comprises:
   switching the second interface of the memory controller from the power-off state to the power-on state when a first counter reaches a first pre-specified value; and switching the second interface of the memory controller from the power-on state to the power-off state when a second counter reaches a second pre-specified value.

3. The method of claim 1, wherein said alternating the second interface between the power-on state and the power-off state comprises:
switching the second interface of the memory controller from the power-off state to the power-on state when a first first-in first-out (FIFO) pointer reaches a first pre-specified trip point; and
switching the second interface of the memory controller from the power-on state to the power-off state when a second FIFO pointer reaches a second pre-specified trip point.

4. The method of claim 1, wherein, in the power-on state, the second interface operates at a second data rate that is greater than the first data rate, and wherein, in the power-off state, the second interface is turned off.

5. The method of claim 4, wherein an average data rate of the second interface matches the first data rate.

6. The method of claim 4, wherein the second data rate is an integral multiple of the first data rate.

7. The method of claim 1, wherein the method comprises:
operating the first interface by using a first clock signal;
generating a second clock signal from the first clock signal by using a Multiplying Injection Locked Oscillator (MILO); and
operating the second interface by using the second clock signal.

8. The method of claim 1, comprising:
in response to detecting an increase in the first data rate of the first interface of the memory controller, ceasing to operate the second interface of the memory controller in burst mode.

9. An integrated circuit, comprising:
a first interface communicatively coupled to a processer;
a second interface communicatively coupled to a memory device; and
a control circuit to operate the second interface in burst mode in response to detecting a decrease in a first data rate of the first interface, wherein the burst mode comprises alternating the second interface between a power-on state and a power-off state.

10. The integrated circuit of claim 9, wherein said alternating the second interface between the power-on state and the power-off state comprises:
switching the second interface from the power-off state to the power-on state when a first counter reaches a first pre-specified value; and
switching the second interface from the power-on state to the power-off state when a second counter reaches a second pre-specified value.

11. The integrated circuit of claim 9, wherein said alternating the second interface between the power-on state and the power-off state comprises:
switching the second interface of from the power-off state to the power-on state when a first first-in first-out (FIFO) pointer reaches a first pre-specified trip point; and
switching the second interface from the power-on state to the power-off state when a second FIFO pointer reaches a second pre-specified trip point.

12. The integrated circuit of claim 9, wherein, in the power-on state, the second interface operates at a second data rate that is greater than the first data rate, and wherein, in the power-off state, the second interface is turned off.

13. The integrated circuit of claim 12, wherein an average data rate of the second interface matches the first data rate.

14. The integrated circuit of claim 12, wherein the second data rate is an integral multiple of the first data rate.

15. The integrated circuit of claim 9, comprising:
a Multiplying Injection Locked Oscillator (MILO) to generate a second clock signal from a first clock signal;
wherein the first interface operates based on the first clock signal; and
wherein the second interface operates based on the second clock signal.

16. The integrated circuit of claim 9, wherein the control circuit ceases to operate the second interface in the burst mode in response to detecting an increase in the first data rate of the first interface.

17. A system, comprising:
a processor coupled to a first interface of a memory controller;
a memory device coupled to a second interface of the memory controller; and
the memory controller comprising a control circuit to operate the second interface in burst mode in response to detecting a decrease in a first data rate of the first interface, wherein the burst mode comprises alternating the second interface between a power-on state and a power-off state.

* * * * *